Aug. 3, 1954
H. J. GRAHAM
2,685,630
WELDING SYSTEM
Original Filed Aug. 10, 1948
2 Sheets-Sheet 1
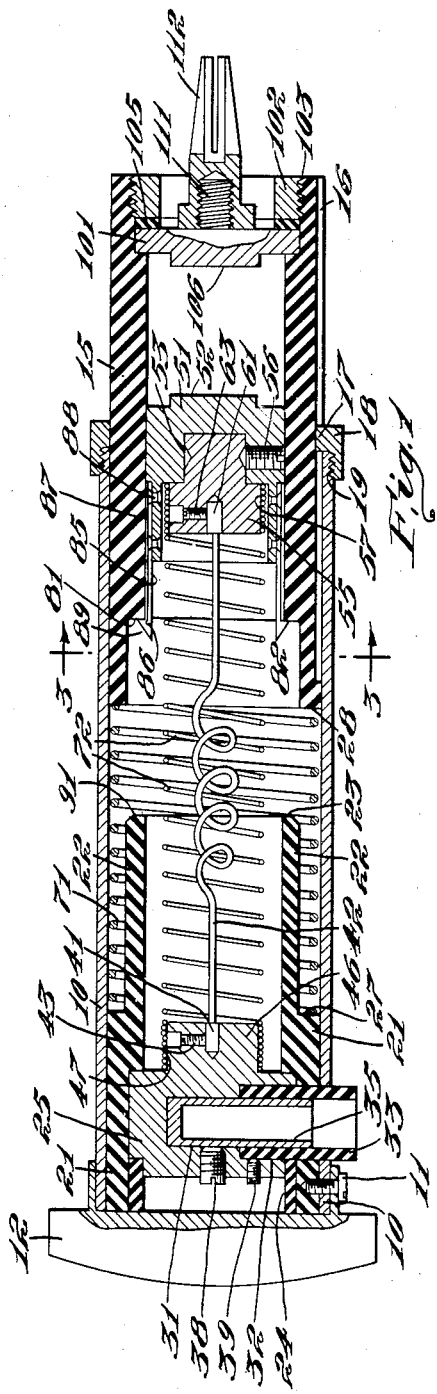
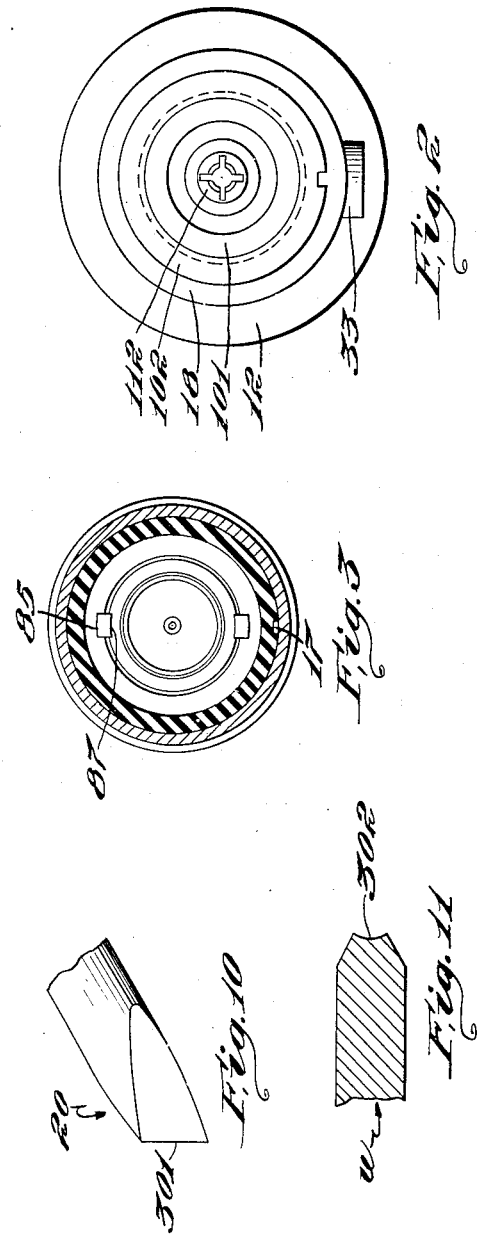
Inventor
Harold J. Graham
by Roberts, Cushman & Groves
Att'ys.

Aug. 3, 1954     H. J. GRAHAM     2,685,630
WELDING SYSTEM
Original Filed Aug. 10, 1948     2 Sheets-Sheet 2
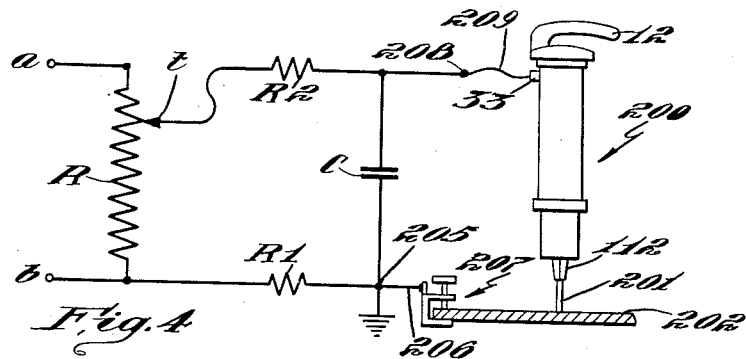
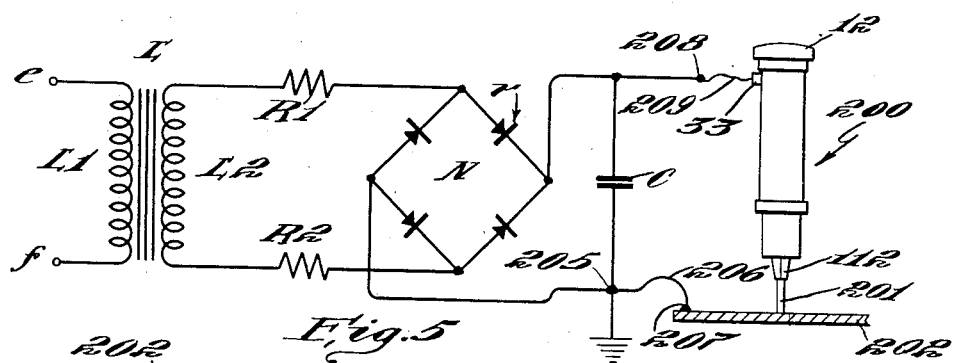
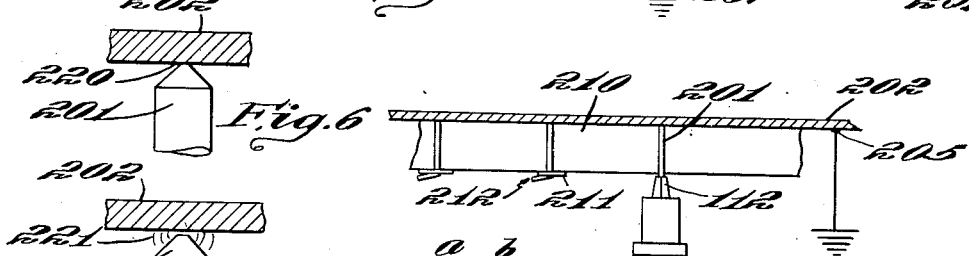
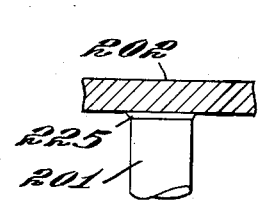
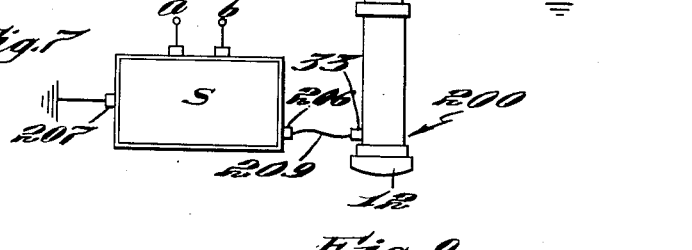
Inventor
Harold J. Graham
by Roberts, Cushman & Grover
Att'ys.

Patented Aug. 3, 1954

2,685,630

UNITED STATES PATENT OFFICE 2,685,630

WELDING SYSTEM

Harold J. Graham, Highland Park, Mich., assignor to Graham Manufacturing Corporation, Detroit, Mich., a corporation of Michigan Original application August 10, 1948, Serial No. 43,498. Divided and this application October 26, 1949, Serial No. 123,715

12 Claims. (Cl. 219—10)

The present invention relates to electric welding systems and more particularly to a welding method and to welding equipment of the type wherein a welding current impulse is applied simultaneously with a mechanical blow tending to unite the construction elements to be joined. This application is a division of my co-pending application Serial No. 43,498, filed August 10, 1948, now Patent No. 2,518,463 of August 15, 1950, which is in part a continuation of application Serial No. 615,758, filed September 12, 1945, now Patent No. 2,467,379 of April 19, 1949.

It has heretofore been proposed (for example in United States Patent No. 1,066,468 to Chubb) to apply a percussive blow to two work pieces, for example wires, while directing a welding current through the two pieces. However, these previously proposed systems require rather elaborate current timing, work holding, and blow applying mechanisms for correlating the mechanical and electrical energy impulses; in most instances such provisions are made necessary due to the fact that the work pieces are first brought into contact, whereupon an arc is drawn and thereafter the percussion blow applied.

It is one of the main objects of the present invention to provide an extremely simple, rugged and yet reliable system for the application of a mechanical blow and an electric welding impulse to two work pieces to be joined by welding with welding apparatus of the type dealt with in my Patent No. 2,467,379.

In one of its principal aspects, the invention deals with the art of welding a rod or block shaped metal body (herein referred to as stud) to a surface intersecting the general direction of the stud, by providing one end of the stud with a substantially high resistance portion which offers a contact area considerably smaller than the cross sectional area of the stud by contacting this end portion with the surface to which the stud is to be welded, and by sending a current through the stud and the surface while applying thereto pressure which as to intensity and time characteristic may vary between that exerted by a pneumatic tool and that applied as a percussive blow by a spring operated tool, whereby the high current density due to the reduced current carrying capacity of the narrow cross section at the contact portion imparts to the metal at that point a high temperature causing it to melt which instantaneous melting separates the end of the stud from the surface, effecting the formation of an arc. This reduced tip portion of the stud may be constituted by a wedge shaped or circular edge, a point, or simply an uneven end such as a clipped off end surface or, instead of shaping the end of the stud as indicated above, it might be reduced in cross sections through an appreciable length for the same purpose, namely to cause initial flow of current sufficiently high to melt the material of the stud end so as initially to distance the stud and work piece not only to facilitate arc formation by ionizing and concomitantly widening the gap between stud and work piece but also by melting both work pieces.

In another aspect, the invention is concerned with the configuration of studs for carrying out the above indicated method of welding, such studs comprising according to the invention a smooth shank portion and a tip portion (herein also referred to as wire) extending in an axial direction from the shank portion with a cross sectional area substantially smaller than that of the shank portion, the ratio of length to cross section of the tip portion or wire being selected to provide a current density sufficient to melt the wire before the stud proper has reached the other work piece. The cross sectional area of the wire tip should be substantially smaller than that of the shank portion, such that the ratio of length to cross section of this tip portion provides a current density sufficient to melt it during the time required by the stud to traverse the length of the tip wire when moved by a force sufficient to fuse the opposite surfaces of stud and work piece, melted by the arc that is initiated by the melting wire. Instead of using a single tip wire, several wires may be arranged at the tip of the stud, depending upon the cross sectional area of the stud proper, as will be described more in detail hereinbelow. The above statements concerning the cross section and length of a single wire tip are analogously applicable to the combined cross sectional area of a multiwire tipped stud. Apparatus for welding in this manner with the work piece initially in mechanical contact is described in my Patent No. 2,467,379.

In order to provide an inert atmosphere for the point of welding, there may be provided instead of the above-mentioned gas developing head a duct associated with the tool holder or a spacer, or separately extending towards the welding area, through which an inert gas can be supplied to the gap between work piece and stud; this gas supply is controlled by instrumentalities correlated with the actuator for the percussion tool or by that tool itself, such as the hammer or the stud carrying element. Apparatus of this type is dealt with more specifically in my copending application Serial No. 81,130, now Patent No. 2,610,278, dated September 9, 1952.

These and other objects, aspects and features appear in the following description of several typical practical embodiments illustrating the novel characteristics of my invention. This description refers to drawings in which Fig. 1 is a longitudinal axial section through a welding hammer according to my invention;

Fig. 2 is a side elevation from the right hand side of Fig. 1;

Fig. 3 is a section on line 3—3 of Fig. 1;

Fig. 4 is a circuit diagram of a direct current supply system for welding apparatus according to the present invention;

Fig. 5 is a circuit diagram similar to Fig. 4, but for use with alternating current;

Figs. 6, 7 and 8 are diagrammatic sections through two work pieces undergoing a welding operation according to my invention;

Fig. 9 is a diagram schematically illustrating the use of a welding hammer according to Figs. 1 to 3, in a system according to Figs. 4 and 5;

Fig. 10 is an isometric view of a wedge shaped stud tip suitable for use with welding tools according to the invention; and Fig. 11 is a longitudinal section of a cupped stud tip.

Referring to Figs. 1, 2 and 3, a welding hammer suitable for carrying out the invention will first be described.

In these figures, numeral 10 designates an outer guard and guide housing made from metal and carrying holding means, for example screwed thereto at 11, a handle 12 which may take the shape of a grip, or a round face fitting the palm of the hand, or any other shape which might seem convenient or suited for a particular purpose at hand. Such holding means might also be used for fastening the housing to a support or frame if mechanical instead of manual support should be desirable.

Slidingly fitting into the guide casing 10 is a plunger casing 15 made from insulating material and having a groove 16 into which fits the key 17 of a holding ring 18 screwed at 19 to the guide housing 10.

Also secured to the guide housing 10, in the present instance by means of the screw 11 holding handle 12, is a releasing block 21 made similar to casing 15 of insulating material, for instance Bakelite tubing and having a tubular extension 22 with a latch releasing rim 23. Held between the releasing block 21 and a spacer tube 24, likewise from insulating material, is a terminal block 25 made from metal and provided with a bore of two diameters, as indicated at 31 and 32. The outer larger bore 32 contains an insulating tube 33 whose inner diameter is that of the inner bore 31, and tube 33 and bore 31 hold a terminal piece 35 of metal which serves for holding a conductor (not shown in the drawing) by means of a contact screw 38. The insulating tube 33 is held in terminal block 25 by means of another set screw 39. The terminal block 25 also has a central bore 41 adapted for receiving a tail wire 42 held therein by means of a set screw 43. A reduced neck 46 of terminal block 25 is provided with a thread 47, for the purpose to be described hereinbelow.

Within the plunger casing 15 slides a plunger 51 having a somewhat raised impact and contact face 52 and a hollow portion 53. A second terminal block 55 fits into the hollow portion of block 51 wherein it is held by means of set screws 56. The outer larger portion of terminal block 55 is provided with a thread 57, similar to thread 47 of terminal block 25. Block 55 is further provided with a conductor receiving bore 61 and a conductor holding screw 63, similar to the corresponding elements 41 and 43 of terminal block 25.

A resetting spring 71 is inserted between the inside of guide casing 10 and the outside of releasing block portion 22; this spring is substantially untensioned with the hammer in inoperative position as shown in Fig. 1 when it rests between the shoulder 27 of block 21 and the end face 28 of casing 15.

A second working spring 72 is fastened to blocks 25 and 55 by engaging it on threads 47 and 57; as will be described hereinbelow, this spring changes during the operation of the hammer from tensioned to compressed condition of stress.

The terminal block 55 is related to the recess 81 of tube 15 by means of a latch device which consists of a number, for example two spring latches 85 which tend to engage the annular shoulder 81 of tube 15 with their retaining faces 86. As indicated in Figs. 1 and 3, the latch springs 85 are fastened in slots 87 of block 51, for example by means of rivets 88. The inclined faces of the latch springs 85, indicated at 89, are so arranged that during operation of the welding hammer, they are engaged by the inner rim edge of tube 21, indicated in Fig. 1 at 91, so that upon contact with rim 91, they are pressed inwardly into releasing position.

The plunger casing 15 carries at its outer end a contact and percussion block 101 fastened thereto by means of a retaining ring 102 engaging at 103 a thread of tube 15, and separated from the contact or percussion block 101 by an insulating washer 105 of elastic material. This washer not only insulates block 101 from ring 102, but also serves as a shock absorber. When the entire mass of blocks 51, 55 and 101 hits ring 102 and casing 15, washer 105 gives to a degree sufficient to absorb the shock and prevent movement of the hammer as a whole. The percussion block 101 has a threaded screw extension 111 carrying a work holder 112, which in the present instance consists of a slotted spring tube adapted for receiving and frictionally holding a stud or wire. It will be evident that this simple work piece holder can be replaced by any chuck or similar construction element, depending on the welding job at hand.

Fig. 4 illustrates the use of a welding hammer constructed in the manner described above by way of illustration, with reference to Figs. 1 to 3.

In Fig. 4, numeral 200 denotes a welding hammer of the above described type. It will be noted that one work piece, indicated at 201, is inserted in holder 112 and held by means of handle 12 against the second work piece 202, which may be a structural element, as for example a steel floor, wall or girder.

The hammer and the work pieces are connected in a direct current welding circuit as follows. The circuit receives energy from terminals $a$ and $b$ of a direct current source appropriate for the purpose for example a 220 volt industrial supply network. A voltage regulating resistor R is connected across the supply wires leading on one side through a current limiting resistor R1, to output terminal 205 which is connected to the second work piece 202 for example by means of a flexible conductor 206 and a clamp 207 or similar instrumentality. The other side of resistor R is connected through an adjustable tap $t$ or other suitable adjusting means, and through a current limiting resistor R2 to a terminal device 208, which, together with terminals $a$, $b$ and 205 and the other circuit elements, may be mounted on a convenient switchboard or power supply unit. Work piece 202 and terminal 205 may be grounded by conventional means, as indicated in Fig. 4. A capacitor C is connected between terminals 205 and 208, for the purpose of storing electric energy supplied by network $a$, $b$, during the period when the welding hammer retains the welding circuit open, that is so long as contact faces 52 and 106 are separated from each other as shown in Fig. 1. A securely insulated flexible conductor 209 leads from terminal 208 to connector elements 35, 42, 55, 51 of the hammer, as indicated in Fig. 1. For a welding tool of the type herein described by way of example, limiting resistors of together approximately 10 ohms and a capacitor of about 18,000 microfarad were found to be satisfactory for welding 1/8" iron wire to sheet steel material.

If it is desired to operate welding hammers according to the present invention from alternating current networks, an arrangement schematically indicated in Fig. 5 may be used.

In Fig. 5, $e$ and $f$ are terminals provided for connection of a standard alternating current supply line to the primary L1 of a transformer L, whose secondary L2 feeds into a rectifier network N through limiting resistors R1 and R2. This rectifier network may be of the conventional bridge type as indicated in Fig. 5, incorporating four rectifier units $r$. The output terminals of the rectifier network N are connected to terminals 205 and 208, which correspond to those indicated with similar numerals in Fig. 4. Terminal 205 may be grounded and is again connected to the work piece 202, whereas terminal 208 is connected, through flexible conductor 209, to the hammer 200.

The above described welding system according to the invention operates as follows:

A work piece 201, for example a stud of the type to be described hereinbelow with reference to Fig. 6, is inserted in work holder 112, and manually held, by means of handle 12, towards the second work piece 202 at the point where the two pieces are to be joined. Pressure is now applied such as to cause compression of springs 71 and 72, and sliding movement between tubes 10 and 15, with the narrower portion 22 of tubular block 21 entering into the wider portion 82 of the plunger casing 15. When the rim portion 91 of tube 22 reaches the oblique latch faces 89, the latches 86 are pressed inwardly causing detachment thereof and sudden release of the plunger 51 which thereupon impacts with considerable force upon the contact block member 101. At the same time, electric contact is established between faces 52 and 106, welding current being supplied from terminal 208 (Figs. 4 and 5), through flexible conductor 209, connector 35, block 25, tail wire 42, connector 61, and connector block 55; the circuit is completed through work holder 112, work pieces 201 and 202, and the connection from connector 207 to terminal 205, which may be accomplished by means of conductor 206, or by way of ground.

The two work pieces 201 and 202 are firmly united by the simultaneous application of the welding current and the percussion blow. When pressure is released from handle 12, block 51 is retracted by spring 72 which became compressed shortly before the impact, until latches 86 again engage the retaining face 81 of tube 15. The spring 71 which was compressed together with spring 72 assists in this retracting operation. With the latches engaged and spring 72 relaxed, the hammer is again in normal condition, ready for withdrawal from the work piece 201, and for insertion of a new work piece and repetition of the above described cycle of operation.

It should be noted that separation of the work pieces for initiating the welding operation is unnecessary and not contemplated; current flow prior to the contact of faces 52 and 106 is impossible and it ceases with the separation of these contact members. To the best of my present knowledge, welding with apparatus of the above described type proceeds as follows.

The contact of work pieces 201 and 202 does not extend over the entire area common to both work pieces, especially since the end of the loose piece is more or less ragged and usually has a chisel point due to the tool with which it was severed, such as shears or cutters. In order to emphasize this condition, I sometimes prefer to use a pointed stud. During the initial stage of the welding act, the work pieces are in the condition schematically indicated in Fig. 6, and at that moment the current flows through a comparatively small cross section at the tip 220 of the stud, which will therefore become heated and melt off rapidly, leading for a very short time (in the order of a millisecond) to the condition indicated in Fig. 7. At that instant, the mechanical contact between the two work pieces is effectively interrupted and the common region ionized so that an arc 222 forms as indicated in Fig. 7, promoting the welding operation by fusing the adjacent portions of both work pieces. In the next instant, the two work pieces are forced even closer together and into each other by the blow, joining over a comparatively extensive area indicated in Fig. 8, where 225 designates the region permanently joined mainly by fusing due to the arc effect indicated in Fig. 7. It will be evident that these stages will not be strictly separated but take place more or less jointly and inseparably; at any rate the two work pieces remain pressurably joined during the entire operation so far as the effect of the hammer is concerned, and the arc formation is due to the melting of the contact area of low effective cross section and hence high resistance rather than to a mechanical separation of the work pieces after a closed current path has been established therethrough.

The particular usefulness of a welding device according to the invention will be apparent with reference to Fig. 9, where 202 is again a metallic structural element, in this instance for example a ceiling or wall which is covered by insulating material 210 temporarily attached thereto, and required permanently to be affixed by metal studs. In order to accomplish this operation, studs 201, held in chuck 112 of the welding hammer 200 according to the invention, are inserted through the insulation layer 210, approximately perpendicular to wall 202, until they touch it, whereupon with continued pressure against handle 12, the above described welding takes place, affixing the stud 201 firmly to wall 202. The hammer is withdrawn and the operation repeated. Washers, disks, straps, or similar structural elements indicated at 211, may thereupon be threaded over studs 201, and the latter bent over as indicated at 212 of Fig. 9, thus firmly and permanently fastening the insulation to the metallic wall.

Fig. 9 also indicates how the power supply unit, indicated at S and incorporating the circuit elements shown in Figs. 4 and 5 may best be applied to work of this type.

It is understood that any convenient work holding device, chuck, or other similar appliance can be used with welding tools according to the present invention.

I found that for many purposes, particularly also for welding aluminum work pieces, pointed or edged tips are preferable to blunt tips. Simple points such as shown in Figs. 1 and 7 are often sufficient, but particularly satisfactory results are obtained when the contact area is enlarged such as by extending the essentially point shaped tip according to Fig. 7 into a linear edge as shown at 301 of Fig. 10, or by extending it still further in the shape of a cupped tip with circular edge as shown at 302 of Fig. 11. The larger contact area of tips according to Fig. 10 and particularly Fig. 11 reduces the current density at the weld which is sometimes advantageous since certain metal sheets, for example of copper, tend to burn through instead of welding if the contact area is too small.

It should be understood that the present disclosure is for the purpose of illustration only and that this invention includes all modifications and equivalents which fall within the scope of the appended claims.

I claim:

1. In the art of welding a loose stud or wire to a comparatively larger surface, the method which comprises providing the stud with a substantially uneven end surface, pressing said end surface against said larger surface, and thereafter sending a current through said stud and said surface substantially simultaneously with applying thereto a percussive blow, whereby said current initially melts the region of the contacting surfaces whereupon an arc forms between the surfaces slightly separated and ionized by melting and said blow causes joining of said surfaces.

2. In the art of welding a stud or wire to a surface, the method which comprises shaping one end of the stud with a substantially uneven surface, contacting said end with said surface, and sending a current through said stud and said surface while applying thereto a percussive blow, said current initially melting the material of the contact area, thus separating the end from the surface and forming an arc whereupon said blow joins said surfaces.

3. In the art of welding a stud or wire to a surface, the method which comprises shaping one end of the stud with a point, contacting said point with said surface, and sending a current through said stud and said sufrace while applying thereto a percussive blow, said current initially melting the material of the contact area, thus separating the point from the surface and forming an arc whereupon said blow joins said end to said surface.

4. In the art of welding a loose stud to a comparatively larger surface, the method which comprises providing the stud with an end portion appreciably reduced in cross section, pressing said end portion against said larger surface, and thereafter sending a current through said stud and said surface substantially simultaneously with applying thereto a percussive blow, whereby said current initially melts the region of the end portion and the contacted surfaces to form an arc between the stud and the surface as separated and ionized by the melting whereupon said blow joins said end portion and said surface.

5. In the art of welding a stud or wire to a surface, the method which comprises shaping one end of the stud with a substantially uneven surface, contacting said end with said surface, and sending through said stud and said surface, while applying thereto a percussive blow, a current sufficient initially to melt the material of the contact area, thus separating the end from the surface and forming an arc whereupon said blow joins said surfaces.

6. In the art of welding a stud or wire to a work surface, the method which comprises shaping one end of the stud with an essentially uneven tip surface defining a contact cross section appreciably smaller than the cross section of the stud proper, contacting said tip surface with said work surface, sending a unidirectional current through said surfaces while pressurably contacting them, said current blow initially melting the material of the contact area, thus separating the two surfaces and forming an arc, and continuing said unidirectional current flow and pressurable contact until said surfaces are joined.

7. In the art of welding a stud to a surface, the method which comprises shaping one end of the stud as a wire having a cross section appreciably smaller than that of the stud, contacting said wire with said surface, sending a unidirectional current through said wire and said surface while pressurably contacting said wire and said surface, said current flow initially melting the material of the wire thus separating the wire from the surface and forming an arc, and continuing said unidirectional current flow and pressurable contact until said end and said surface are joined.

8. In the art of welding a stud to a surface, the method which comprises shaping one end of the stud with a point, contacting said point with said surface, sending a unidirectional current through said stud and said surface while pressurably contacting said point and said surface, said current flow initially melting the material of the contact area, thus separating the point from the surface and initiating an arc, and continuing said unidirectional current flow and pressurable contact until said end and said surface are joined.

9. In the art of welding a stud or wire to a surface, the method which comprises shaping one end of the stud with an edge, contacting said edge with said surface, sending a unidirectional current through said stud and said surface while pressurably contacting said edge and said surfaces, said current flow initially melting the material of the contact area, thus separating the edge from the surface and forming an arc, and continuing said unidirectional current flow and pressurable contact until said end and said surface are joined.

10. A method of welding which comprises, prepositioning a pair of metallic members with surfaces in contact, passing an electrical discharge from a condenser therebetween sufficient to produce a fluid condition of the members at the contacting surfaces, and applying a relatively sharp blow to at least one of the members such as to force said one member against the other member and force the contacting surfaces together between the peak and the end of the first pulse of the condenser discharge.

11. In a method of percussive welding electrically conductive members which comprises the steps of positioning the members with surfaces to be welded in contact, connecting a charged electrical condenser between the members so as to produce a sudden discharge of electrical energy between said surfaces, and striking one of the members a sharp blow to force it against the other member during the latter portion of the discharge of electrical energy between said surfaces to force the surfaces together.

12. The method of percussive welding which comprises, positioning a pair of metal members in engagement in substantially the position in which they are to be welded, passing a predetermined condenser discharge welding current impulse through the juncture of said members, and applying a relatively sharp hammer blow to one of the members in a direction to force it toward the other member in predetermined timed relation to said impulse and during the first pulse thereof to force said members together.

References Cited in the file of this patent

UNITED STATES PATENTS

| Number | Name | Date |
| --- | --- | --- |
| 1,339,967 | Murray et al. | May 11, 1920 |
| 1,608,325 | Wagner | Nov. 30, 1926 |
| 2,366,973 | Murray | Jan. 9, 1945 |
| 2,413,370 | Palmer | Dec. 31, 1946 |
| 2,419,749 | Weinhardt | Apr. 29, 1947 |
| 2,459,795 | Dawson | Jan. 25, 1949 |